Figure 1:
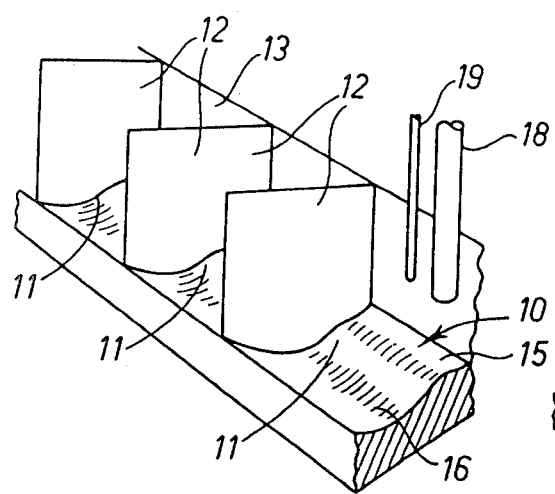

United States Patent [19]

Blicher

[11] Patent Number: 4,481,907
[45] Date of Patent: Nov. 13, 1984

[54] METHOD AND APPARATUS FOR FEEDING ANIMALS

[75] Inventor: Steen Blicher, Fåborg, Denmark

[73] Assignee: Biomat, Inc., Chicago, Ill.

[21] Appl. No.: 459,534

[22] PCT Filed: May 11, 1982

[86] PCT No.: PCT/DK82/00042
§ 371 Date: Jan. 10, 1983
§ 102(e) Date: Jan. 10, 1983

[87] PCT Pub. No.: WO82/03967
PCT Pub. Date: Nov. 25, 1982

[30] Foreign Application Priority Data

May 11, 1981 [DK] Denmark .............................. 2080/81

[51] Int. Cl.³ ................................................. A01K 5/02
[52] U.S. Cl. ................................ 119/51 R; 119/51.11; 119/51.5; 119/61
[58] Field of Search ............... 119/51.5, 51.11, 52 AF, 119/61, 51 R

[56] References Cited

U.S. PATENT DOCUMENTS 3,157,157  11/1964  Clay et al. .......................... 119/51.11
3,386,418   6/1968  Biehl .................................... 119/51 R
3,556,057   1/1971  Icking ................................. 119/51.5

FOREIGN PATENT DOCUMENTS 2843153  4/1979  Fed. Rep. of Germany ..... 119/51.5

Primary Examiner—Hugh R. Chamblee
Attorney, Agent, or Firm—Hubbell, Cohen, Stiefel & Gross

[57] ABSTRACT

A plurality of animals, especially swines or hogs, which are able to move freely in the same enclosure, are fed by means of an apparatus supplying fodder at a low rate to a number of separate feeding places (11) corresponding to the number of animals in the enclosure. These feeding places may be formed by a trough (10) in which the respective feeding places are defined by partition walls (12). The bottom of the trough is separated into a supply section (15) and an eating section (16). In order to satisfy the root instinct of the animals and thereby make it possible to reduce the fodder supply rate to the respective feeding places without causing the animals to become impatient so that they tend to change feeding place, the fodder is at least partly supplied to the supply section (15) which is shaped and/or arranged so that it is uncomfortable for the animals to eat the fodder directly from the supply section but more comfortable to root the fodder to the eating section (16) before eating it.

15 Claims, 4 Drawing Figures

METHOD AND APPARATUS FOR FEEDING ANIMALS

The present invention relates to a method of simultaneously feeding a plurality of animals, especially swines or hogs, which are able to move freely within the same enclosure, fodder being supplied to a number of separate feeding places corresponding to the number of animals in the enclosure.

Such methods by means of which it is attempted to secure that all the animals within the enclosure or the pigpen obtain substantially the same amount of fodder although they may move freely within the enclosure, are known for example from British Pat. No. 1,467,220 and from the applicant's published British Patent Application GB No. 2,056,837 A. Furthermore, by means of the method disclosed in the said patent application it is possible to prolong the eating period of the animals. However, by both of the known methods there are certain limitations regarding the possible prolongation of the eating period, because sooner or later some of the animals will become impatient and tend to change feeding place when the fodder supply rate is decreased.

It is well known that the more slowly eating animals utilize the fodder better than the quick eaters, and that in their natural surroundings, the pigs or hogs are eating small portions of fodder during long periods.

The present invention provides a method of the above type, which renders it possible to reduce the fodder supply rate to the respective feeding places to a still higher extent than is possible by using the above known methods, without even the most impatient of the animals tending to change feeding place.

The method according to the invention is characterized in that at least part of the fodder is supplied to each separate feeding place at a supply position thereof where the animal can eat the fodder with difficulty only, while the animal is able to rake the fodder from the supply position to a better eating position of the feeding place. It has been found that the fact that the animals have to rake the fodder supplied to the respective feeding places to a more comfortable eating position satisfy the natural rooting or searching tendency of certain animals, especially swines or hogs, in connection with their eating. The fact that the rooting or searching tendency of the animals is satisfied, delays the eating rate of the animals without their becoming impatient. The eating period for a given fodder ration may thereby become substantially prolonged compared to the prolongation possible by means of the known methods. The extent to which the eating time may be prolonged is to some extent dependent on the structure and composition of the fodder. However, tests have shown that the eating period for a swine weighing 50 kg may be extended to about one hour for a normal fodder ration by 3 daily feeding periods.

The fodder may be supplied to the respective feeding places continuously or intermittently in small portions, which may be in the order of one mouthful or smaller. Irrespective of the manner in which the fodder is supplied, equal amounts of fodder are preferably, but not necessarily supplied to the respective feeding places in order to secure a substantially uniform growth of the animals. However, the fodder supply rate ought to be adjustable, because it has been found that the maximum eating period which may be obtained by using the method according to the invention, to some extent varies from one group of animals to another, or from one enclosure or pigpen to another. The slowest possible fodder supply rate may easily be determined by observing the behavior of the animals when the supply rate is continuously decreased. When signs of agitation and change of feeding place are observed the minimum fodder supply rate has been reached.

The fodder may be supplied as finished mixed fodder, or it may be supplied partly as dry fodder and partly as liquid. In the latter case, the dry fodder may be supplied to each feeding place at the supply position while the liquid may be supplied directly at the eating position. Alternatively, the dry fodder and the liquid may be supplied to each feeding place at separate supply positions thereof. In that case, the animals not only have to rake or root the fodder to the eating position, but also have to mix the dry fodder and the liquid, whereby the eating period is further extended. Furthermore, the eating at the eating position may be delayed by means of stationary or moveable obstacles which in themselves make the eating more difficult. These obstacles may, however, also be shaped in such a manner that they stimulate the root and search instinct of the animals, whereby the well-being and consequently also the patience of the animals are increased.

The invention also provides an apparatus for use in carrying out the method described above, said apparatus comprising a plurality of separate feeding places and fodder supply means adapted to supply fodder to the respective feeding places, and the apparatus according to the invention is characterized in that each feeding place comprises a supply section which is shaped and/or arranged so that the animals can eat fodder directly from that section only with difficulty, and an eating section which is more easily accessible to the animals than the supply section, and which is so shaped and arranged in relation to the supply section that the animals may root fodder from the supply section to the eating section of the same feeding place, and in that the fodder supply means are adapted to supply at least part of the fodder to the supply section of the respective feeding place. As explained above such an apparatus permits that the natural rooting or feed searching instinct of the animals becomes satisified, whereby it becomes possible to adjust the fodder supply means at an especially small fodder supply rate without the animals becoming impatient or losing interest in their feeding place. p In principle, the fodder supply section may be arranged at any level in relation to the eating section, provided that the animals are encouraged to rake the fodder from the supply section to the eating section before they eat the fodder. However, in a preferred embodiment the fodder supply section is arranged at a higher level than the eating section, and each single feeding place may then be shaped so that the fodder is automatically passed down into the eating section when it is raked from the more inconveniently positioned and/or shaped supply section. The said inconvenient position of the supply section may most simply be obtained; the supply and eating sections of each feeding place are mutually arranged so that the supply section is the more remote to the animal in the normal eating position of the animal. Thus, the supply section may be arranged innermost in the eating trough, where it may also form an elevation in relation to the eating section of the trough.

Figure 2:
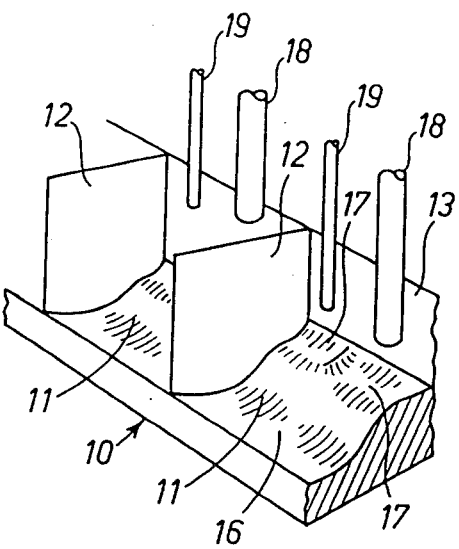
Figure 3:
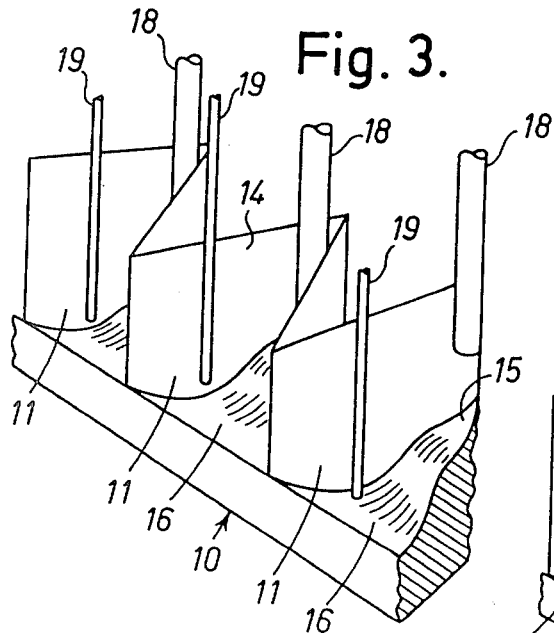
Figure 4:
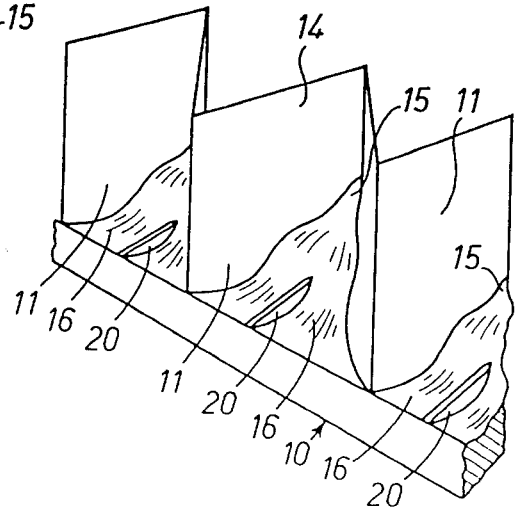

The invention will now be further described with reference to the drawings, wherein FIG. 1 is a diagrammatic perspective view showing an embodiment of a trough for an apparatus according to the invention, FIG. 2 is a modified embodiment of the trough where each feeding place comprises two separate supply sections, and FIGS. 3 and 4 illustrate a further embodiment of the trough without and with obstacles in the eating sections.

The drawings show various embodiments of a trough 10 forming part of a feeding apparatus, for example for swines or hogs. In FIGS. 1 and 2 the feeding trough is separated into separate feeding places 11 by means of partition walls 12 and a back wall 13, while in FIGS. 3 and 4 the respective feeding places are formed by means of a zigzag-shaped wall 14. In FIGS. 1, 3, and 4, the bottom of the trough at each feeding place 11 is divided into a rear supply section 15 and an eating section 16 positioned at a lower level at the front. In the embodiment shown in FIG. 2 the bottom of the trough is divided into two rear separate supply sections 17 positioned side by side, and an eating section 16 which is also positioned at a lower level than the supply sections 17.

The feeding apparatus in connection with which the trough 10 is used, is also provided with fodder supply means which are adapted to supply equal amounts of fodder to the respective feeding places 11 continuously or intermittently. These fodder supply means may, for example, be of any of the types described in the above British patent and patent application. Thus, the fodder may be supplied to each of the feeding places through fodder supply tubes 18 and 19, and the tube 18 may, for example by adapted to supply dry fodder, while the tube 19 may be adapted to supply liquid, such as water or fodder soup.

When the apparatus according to the invention is operating, dry fodder and liquid are continuously supplied through the fodder supply tubes 18 and 19 to each single feeding place at a suitable low rate. The dry fodder as well as the liquid may be supplied to the supply section 15 or 17 as indicated in FIGS. 1 and 2. When fodder is supplied, it will be very inconvenient to the animal at the respective feeding place to eat the fodder directly from the supply section, and therefore, the animal will be inclined to rake or root the fodder down into the eating section 16 prior to eating it. This satisfies the natural rooting and feed searching instinct of the animal, especially swines or hogs, and the animal will therefore not become inclined to change feeding place even when the fodder is supplied at an especially low rate. When the dry fodder and the liquid are supplied to separate supply sections in the form of depressions positioned side by side as in the embodiment shown in FIG. 2, the animal has to root the liquid as well as the dry fodder down into the eating section 16 and mix the components at that position before eating them, whereby the eating process is further delayed.

In the embodiment shown in FIG. 3, the liquid is supplied directly to the eating sections 16 through the supply tubes 19, while the dry fodder is supplied to the supply sections 15. In the embodiments shown in FIGS. 3 and 4, the supply sections 15 have been formed so that they are not easily accessible, not only because they are positioned rearmost, but also because they are defined between adjacent parts of the back wall 14 forming an acute angle.

In any of the embodiments shown in FIGS. 1-3 the eating section 16 of each feeding place 11 may be provided with one or more root instinct stimulating obstacles 20, which may have the form of elevations, projections, or vertically arranged plates, such as shown in FIG. 4. These obstacles may be stationary, but they may also be moveable, for example swingable about a vertical axis. Such obstacles will not only physically delay the eating process, but will also mentally give rise to a delay of the eating rate, because the animals will like to root around such obstacles.

I claim:

1. A method of simultaneously feeding a plurality of animals which are able to move freely within the same enclosure, said method comprising supplying during a feeding period equal amounts of fodder to a number of separate feeding places corresponding to the number of animals in the enclosure, at a slow rate not exceeding the maximum eating rate of any of the animals, said feeding places comprising eating sections and supply sections, at least part of the fodder being supplied to each separate feeding place at the supply section thereof where the respective animal can eat the fodder only with difficulty thereby causing the animal to rake the fodder from the supply section to the eating section of the feeding place.

2. A method according to claim 1, characterized in that the fodder is supplied to each feeding place continuously during a feeding period.

3. A method according to claim 1, characterized in that the fodder is supplied to each feeding place intermittently in small portions during each feeding period.

4. A method according to claim 1, characterized in that the fodder is supplied to each feeding place at a rate which is sufficiently low to stimulate the search instinct of the animals and which is sufficiently high to maintain the eating interest at all of the animals.

5. A method according to claim 1, characterized in that the fodder is supplied partly as dry fodder and partly as liquid.

6. A method according to claim 5, characterized in that the dry fodder is supplied to each feeding place at said supply position, while the liquid is supplied at said eating position.

7. A method according to claim 5, characterized in that the dry fodder and the liquid are supplied to each feeding place at separate supply positions thereof.

8. A method according to claim 1, characterized in that the eating rate of the animal at each eating position is delayed by means of stationary or moveable obstacles.

9. A method according to claim 8, characterized in that the root and search instincts of the animals are stimulated by said obstacles.

10. A feeding apparatus for simultaneously feeding a plurality of animals which are able to move freely within the same enclosure, said apparatus comprising a plurality of separate feeding places each including a supply section for supplying fodder to said feeding place while being shaped and arranged for permitting an animal to eat fodder directly from said section only with difficulty, and an eating section which is more easily accessible to the animal than said supply section, said eating section being shaped and arranged in relation to said supply section for permitting the animal to rake fodder from the supply section to the eating section of the same feeding place, said feeding apparatus further comprising fodder metering and supply means for supplying fodder to each feeding place so that at least part of the fodder is directed to the supply section of the respective feeding place and, control means for controlling and metering the supply means for supplying during a feeding period equal amounts of fodder to said feeding places at a slow rate not exceeding the maximum feeding rate of any of the animals.

11. An apparatus according to claim 10, characterized in that the supply section of each feeding place is arranged at a higher level than the eating section.

12. An apparatus according to claim 11, characterized in that the supply and eating sections of each feeding place are mutually arranged so that the supply section is the more remote to the animal in the normal eating position of the animal.

13. An apparatus according to claim 12, characterized in that each feeding place comprises two separate supply sections and in that the fodder supply means (18,19) are adapted to supply dry fodder to one and liquid to the other of said supply sections.

14. An apparatus according to claim 13, characterized in that one or more obstacles for stimulating the root instinct of the animals is/are arranged in the eating section of each feeding place.

15. An apparatus according to claim 14, characterized in that the obstacles are moveable.

* * * * *